United States Patent
Petitjean et al.

(10) Patent No.: US 12,018,638 B2
(45) Date of Patent: Jun. 25, 2024

(54) WIND TURBINE SERRATIONS WITH UPSTREAM EXTENSION

(71) Applicants: GE WIND ENERGY GMBH, Salzbergen (DE); LM WIND POWER A/S, Kolding (DK); BLADE DYNAMICS LIMITED, Eastleigh Hampshire (GB)

(72) Inventors: Benoit Petitjean, Salzbergen (DE); Guannan Wang, Salzbergen (DE); Andreas Herrig, Salzbergen (DE); Jeremy Hurault, Eastleigh Hampshire (GB); Dongke Sun, Eastleigh Hampshire (GB)

(73) Assignees: GE WIND ENERGY GMBH, Salzbergen (DE); LM WIND POWER A/S, Kolding (DK); BLADE DYNAMICS LIMITED, Eastleigh Hampshire (GB)

( * ) Notice: Subject to any disclaimer, the term of this patent is extended or adjusted under 35 U.S.C. 154(b) by 0 days.

(21) Appl. No.: 18/018,321

(22) PCT Filed: Jun. 30, 2021

(86) PCT No.: PCT/EP2021/068035
§ 371 (c)(1),
(2) Date: Jan. 27, 2023

(87) PCT Pub. No.: WO2022/135751
PCT Pub. Date: Jun. 30, 2022

(65) Prior Publication Data
US 2023/0279835 A1    Sep. 7, 2023

(30) Foreign Application Priority Data
Dec. 22, 2020   (GB) ..................................... 2020360

(51) Int. Cl.
*F03D 1/06*    (2006.01)

(52) U.S. Cl.
CPC .......... *F03D 1/0633* (2013.01); *F03D 1/0642* (2023.08); *F03D 1/0645* (2023.08);
(Continued)

(58) Field of Classification Search
CPC combination set(s) only.
See application file for complete search history.

(56) References Cited

U.S. PATENT DOCUMENTS

| 2003/0175121 A1* | 9/2003 | Shibata ................. F03D 1/0641 416/131 |
| 2011/0018282 A1* | 1/2011 | Hayashi ................... F03D 9/25 290/55 |

(Continued)

FOREIGN PATENT DOCUMENTS

| WO | 2014048437 A1 | 4/2014 |
| WO | 2015121044 A1 | 8/2015 |
| WO | 2017088880 A1 | 6/2017 |

*Primary Examiner* — Binh Q Tran
(74) *Attorney, Agent, or Firm* — Nath, Goldberg & Meyer; Jerald L. Meyer; Tanya E. Harkins

(57) ABSTRACT

A trailing edge panel is configured to be attached to a trailing edge of a wind turbine blade and includes a base element and a number of protruding aerodynamic elements. The base element has an attachment part configured to be attached to and extend from the trailing edge of the wind turbine blade and to an upstream position on a first blade side of the wind turbine blade. The base element further has a serrated part extending from the second side of the attachment part and configured to project out from the trailing edge of the wind turbine blade, wherein the serrated part comprises a number of serrations, including a first serration and a second serration. The number of protruding aerodynamic elements, (Continued)

including a first protruding aerodynamic element, includes a first protruding part attached to the serrated part of the base element.

17 Claims, 10 Drawing Sheets

(52) U.S. Cl.
CPC ........ *F03D 1/06495* (2023.08); *F03D 1/0681* (2023.08); *F03D 1/069* (2023.08); *F05B 2240/3042* (2020.08); *F05B 2260/96* (2013.01)

(56) References Cited

U.S. PATENT DOCUMENTS

| | | | |
|---|---|---|---|
| 2013/0129519 A1* | 5/2013 | Nielsen | F03D 1/065 416/223 R |
| 2013/0266441 A1* | 10/2013 | Enevoldsen | F03D 1/065 416/1 |
| 2016/0312763 A1* | 10/2016 | Arce | F03D 1/0633 |
| 2017/0107970 A1* | 4/2017 | Arce | F03D 1/0641 |
| 2019/0113019 A1* | 4/2019 | Asheim | F03D 1/0633 |
| 2020/0003177 A1 | 1/2020 | Oerlemans | |
| 2020/0003178 A1* | 1/2020 | Oerlemans | F03D 1/0683 |
| 2020/0072185 A1* | 3/2020 | Wang | F04D 29/667 |

\* cited by examiner

A

WIND TURBINE SERRATIONS WITH UPSTREAM EXTENSION

This is a National Phase Application filed under 35 U.S.C. 371 as a national stage of PCT/EP2021/068035, filed Jun. 30, 2021, an application claiming the benefit of Great Britain Application No. 2020360.0, filed Dec. 22, 2020, the content of each of which is hereby incorporated by reference in its entirety.

FIELD OF INVENTION

The present invention relates to a trailing edge panel for a wind turbine blade, particularly a trailing edge one-piece noise reducing panel configured to be attached to the trailing edge of a wind turbine blade. Furthermore, the present invention relates to a wind turbine blade comprising the trailing edge panel.

BACKGROUND OF THE INVENTION

Wind power is increasingly popular due to its clean and environmentally friendly production of energy. The rotor blades of modern wind turbines capture kinetic wind energy by using sophisticated blade design created to maximise efficiency.

One of the continued considerations for wind turbine blade design is the operational noise produced, when such blades rotate, in particular for onshore wind turbine installations. A large portion of the noise produced during wind turbine operation is due to turbulence formed at the trailing edge of a wind turbine blade as the relatively faster suction-side airflow meets the relatively slower pressure-side airflow. The relatively high level of turbulent kinetic energy in the combined airflows results in a scattering of pressure fluctuations resulting from turbulent airflow at the trailing edge, which produces scattering noise.

As modern wind turbine blades are manufactured at increasingly longer blade lengths, the longer span of the blades may result in higher relative wind speeds experienced by the blades. Accordingly, this can lead to relatively large levels of trailing edge noise. Also, the size of the noise source increases, leading to higher noise levels, when not taking countermeasures. Hence, noise reducing devices and associated blade designs are increasingly desired.

To this end, modern wind turbine blades are sometimes provided with serrations along the blade trailing edges, in an effort to reduce blade trailing edge noise and/or to improve wind turbine blade efficiency, as can be seen in EP1314885. The serrations are typically provided by attaching a serrated panel at the trailing edge of the wind turbine blade. While the noise mitigating properties of such serrations are advantageous, several drawbacks remain. Often, finding the right serration geometry is a trade-off between noise mitigation performance and structural requirements.

There are several ways of attaching a panel to the trailing edge of the blade. US 2011/0142635 A1 describes a blade extension panel provided with a cutaway mounting portion for mounting the extension panel to the blade such that the blade extension is substantially flush with a surface of the blade. The cutaway portion defines a notch configured to locate the blade extension relative to the rotor blade. However, such an embodiment entails that the cutaway portion must be specifically designed for a specific portion of a wind turbine blade.

Furthermore, a plurality of on-surface addons for guiding air at the trailing edge area have been proposed for noise mitigation. When multiple addons are installed on and around the trailing edge, they have to be carefully designed and aligned in order to achieve the maximum noise reduction. However, discontinuities between different addons are often hindering the overall noise reduction effect of the devices. In addition, the requirements for installation become stringent and time-consuming to ensure maximum noise reduction.

Accordingly, there is still a need to optimise the design of noise reducing devices in order to maximise noise mitigation and simplify the manufacturing and installation processes.

SUMMARY OF INVENTION

It is an object of the present invention to provide a trailing edge panel for a trailing edge of a wind turbine blade having improved noise mitigation. Furthermore, it is an object of the present invention to provide a trailing edge panel which is easy to install and/or retrofit to a blade.

The present inventors have found that one or more of said objects may be achieved in a first aspect of the invention relating to a trailing edge panel configured to be attached to a trailing edge of a wind turbine blade, the trailing edge panel comprising a base element having
   an attachment part configured to be attached to and extend from the trailing edge of the wind turbine blade and to an upstream position on a first blade side of the wind turbine blade,
   a serrated part extending from the attachment part and being configured to project out from the trailing edge of the wind turbine blade, wherein the serrated part comprises a plurality of serrations, including a first serration and a second serration,
a number of protruding aerodynamic elements, including
   a first protruding aerodynamic element, comprising
   a first protruding part attached to the serrated part of the base element; and
   a second protruding part extending from the first protruding part towards the attachment part at an inclined angle relative to the base element and being configured to be attached to and extend along a second blade side of the wind turbine blade.

The inclined angle is an angle between the first attachment surface and a lower surface of the first protruding aerodynamic element. The inclined angle corresponds to an angle between the first blade side and the second blade side of the wind turbine blade. In that way, the base element and the first protruding aerodynamic element together forms a clamp shape adapted to be fitted onto the trailing edge of the wind turbine blade. In this way, the trailing edge panel is configured to be tightly fit to the trailing edge of the wind turbine blade.

The inclined angle is less than 90 degrees, preferably between 70 and 10 degrees, such as between 20 and 50 degrees or 15 and 35 degrees.

In most embodiments, the inclined angle is not constant, but increase and/or decrease such that the lower surface of the second protruding parts follows the curvature of the trailing edge of the wind turbine blade i.e. the lower surface of the second protruding part may be curved rather than straight.

A protruding aerodynamic element is herein preferably defined as an element which substantially independent of the other elements of the trailing edge panel, is configured to influence air near the trailing edge of a wind turbine blade in a way that either reduces noise or increases overall blade performance or in a way that does not reduce overall blade performance more than the indirect gains through reduced noise allow to compensate.

When the trailing edge panel is installed at the trailing edge of a wind turbine blade, the number of protruding aerodynamic elements extend from the serrated part of the base element and onto the second blade side of the wind turbine blade upstream of the trailing edge and towards the leading edge. In other words, the protruding aerodynamic elements extend both on a part of the blade and on a part of the serrations.

Thus, the present invention combines traditional serrations, which extend downstream of the blade, and on-surface devices near the trailing edge, in a one-piece trailing edge panel, which can be easily clamped onto the trailing edge. Consequently, this design enables a better cooperation between the two kinds of noise mitigation devices and eliminates the need for careful alignment of the elements during installation. Furthermore, by integrating serrations with upstream on-surface devices, the present invention eliminates any discontinuities between the different elements, resulting in increased noise mitigation. In addition, the on-surface devices also provide stiffness and structural reinforcement to the serrations. Finally, the present invention simplifies the manufacturing and installation processes of noise mitigation devices on the wind turbine blade.

In some embodiments, the trailing edge panel is configured to be attached to a trailing edge with a flatback configuration i.e. not a sharp or rounded trailing edge, but a trailing edge with a flat even surface extending between the first and second side of the wind turbine blade. In some embodiments, the trailing edge panel is configured to be attached to a trailing edge with a sharp edge or rounded trailing edge.

The base element is preferably a substantially plate-like structure consisting of an attachment part and a serrated part. Thus, the base part is preferably a unitary plate-like structure, and the attachment part and serrated part of the base element meet at a boundary or interface configured to substantially follow the trailing edge of a wind turbine.

The attachment part is the part of the base part configured to be attached to a blade surface between the trailing edge of the wind turbine blade and an upstream position on a first blade side of the wind turbine blade. Thus, at least one surface of the attachment part may be shaped and dimensioned such that it is adapted to follow the shape of the first blade side of the wind turbine blade. The attachment part may be attached to a blade surface using adhesives, fasteners or the like.

The attachment part itself is preferably also a substantially plane plate-like structure.

In some embodiments, the attachment part comprises:
a first longitudinal end for arrangement nearest a tip end of the wind turbine blade,
a second longitudinal end for arrangement nearest a root end of the wind turbine blade,
a first side for arrangement nearest a leading edge of the wind turbine blade,
a second side for arrangement farthest from the leading edge of the wind turbine blade,
a first attachment surface configured for being attached to the first blade side of the wind turbine blade, and
a second attachment surface arranged opposite the first attachment surface and configured for facing away from the first blade side of the wind turbine blade.

The serrated part of the base part extends from the attachment part and is configured to project out from the trailing edge of the wind turbine blade. The serrated part comprises a number of serrations, including a first serration and a second serration. However, the serrated part may also comprise more than two serrations, preferably more than ten, such as more than fifty serrations.

In some embodiments, the serrated part of the base part is substantially flat and have substantially the same thickness as the attachments part.

In some embodiments, the number of serrations and/or the first and second serration each comprises
a base side proximal to the second side of the attachment part,
an apex distal to the second side of the attachment part with a notional line extending from a midpoint of the base side to the apex,
a first serration side extending between the base side and the apex, and
a second serration side extending between the base side and the apex,
a first serration surface in continuance of the first attachment surface, defined by the base side, the apex, the first side and the second side,
a second serration surface arranged opposite the first serration surface, in continuance with the second attachment surface.

Thus, the first side of one serration always meets or is arranged adjacent to the second side of another serration.

In some embodiments, the first serration and the second serration are arranged adjacent to each other, such that a valley region is formed between the first serration side of the first serration and the second serration side of the second serration or vice versa, i.e. a second side of the first serration and a first side of the second serration.

Preferably, the serrations of the number of serrations are all arranged adjacent to each other, such that a plurality of valley regions are formed between adjacent serrations.

The valley region between two adjacent serrations corresponds to the region, where a first side of one serration and a second side of an adjacent serration meet.

In some embodiments, the first and second sides of the plurality of serrations and/or the first and second serration do not extend all the way to the base side, but meet the first and second sides of adjacent serrations a pre-determined distance from the base side, such as to provide a small extension of the trailing edge, which is not serrated. Such an extension can be used to fixate the protruding aerodynamic elements to a surface of the serrated part at the valley region between two adjacent serrations. Such an extension is considered part of the serrated part of the base element, since it is configured to project out from the trailing edge of a wind turbine blade.

Thus, the serrations may be plate-like elements having a substantially triangular or teeth-like shape, but not necessarily with straight sides.

In some embodiments, one or more of the plurality of serrations are cone shaped serrations. Cone shaped serrations contribute better to the noise reduction at high frequencies than flat serrations. Thus, they can be used in combination with aerodynamic elements, such as finlets, which contribute to the noise reduction at low frequencies.

The cone shaped serrations each comprise a base section with a cross-sectional shape extending and tapering into a serration tip.

Preferably, the cross-sectional shape of the base section is circular, elliptical or square. However, the cross-sectional shape of the base section may also have a more complex shape. Preferably, the serration tip of the cone shaped serrations is rounded.

Thus, in configurations where the serrations are cone shaped serrations, the serrated part of the base part is not substantially flat, but have a maximum thickness corresponding to the base section of the serrations.

In preferred embodiments, a trailing edge panel comprising cone shaped serrations is configured to be attached to a trailing edge with a flatback configuration. In this way, at least part of the base section of the cone shaped 30 serrations may be attached to the flatback surface of the trailing edge, whereas part of the base section extends from the attachment part of the base part of the trailing edge panel. Thus, in such embodiments, both the attachment part and the serrated part of the base part may comprise a surface configured to be attached to the trailing edge of the wind turbine blade. The base section of the cone shaped serrations may be attached to the flatback surface using adhesives, fasteners or the like.

Each serration may comprise a number of protruding aerodynamic elements, such as one, two, three, four, five or more protruding aerodynamic elements. Furthermore, the serrated part may comprise a protruding aerodynamic element at the valley region between two adjacent serrations, such as at the valley region between all adjacent serrations. However, only one protruding aerodynamic element may be attached at the valley region between two adjacent serrations.

In some embodiments, the first protruding part of the first aerodynamic protruding element is attached to the serrated part of the base element at a valley region between the first serration and the second serration. In such embodiments, the first protruding part of the first protruding aerodynamic element may be attached at the first serration surface at the valley region between the first and second serration. In some embodiments, the first protruding aerodynamic element may be attached at a small extension of the serrated part proximal to the attachment part. In other embodiments, the first protruding part of the first protruding aerodynamic element comprises two diverging sections extending from the valley region between the first and second serration and along part of the first side of the first serration and part of the second side of the second serration and is attached to the serrated part along part of the first side of the first serration and part of the second side of the second serration. In still other embodiments, the first protruding part of the first protruding aerodynamic element is attached to the serrated part at the valley region between the first and second serration surface, i.e. not on the first serration surface. The second protruding part of the protruding aerodynamic element, i.e. a protruding part which is not attached to the serrated part, extends from the first protruding part away from the serrated part of the base element and towards the attachment part of the base element.

In some embodiments, the first protruding part of one or more of the number of aerodynamic protruding elements is attached to the serrated part of the base element at a valley region between two adjacent serrations. In such embodiments, one or more of the number of protruding aerodynamic elements may be attached at the first serration surface at the valley region between two adjacent serrations. In some embodiments, one or more of the number of protruding aerodynamic elements may be attached at a small extension of the serrated part proximal to the attachment part. In other embodiments, the first protruding part of one or more of the number of aerodynamic elements comprises two diverging sections extending from the valley region between two adjacent serrations and along part of the first side of one serration and part of the second side of an adjacent serration and is attached to the serrated part along part of the first side of one serration and part of the second side of the adjacent serration. In still other embodiments, the first protruding part of one or more of the number of protruding aerodynamic elements is attached to the serrated part at the valley region between two adjacent serrations between the first and second serration surface, i.e. not on the first serration surface. The second protruding part of one or more of the number of protruding aerodynamic elements, i.e. a protruding part, which is not attached to the serrated part, extends from the first protruding part away from the serrated part of the base element and towards the attachment part of the base element.

In some embodiments, the first protruding part of the first protruding aerodynamic element extends from the apex or from the first or second serration side of the first serration to the base side of the first serration in a direction substantially parallel to the notional line.

In some embodiments, the first protruding part of one or more of the number of protruding aerodynamic element extends from the apex of a serration to the base side of that serration in a length direction substantially parallel to the notional line. In some embodiments, one or more of the number of protruding aerodynamic elements extends substantially parallel to the notional plane.

In some embodiments, the first protruding part of one or more of the number of protruding aerodynamic elements extends from the first or second serration side of a serration to the base side of that serration in a direction substantially parallel to the notional line.

In some embodiment, the first protruding part of one or more of the number of protruding aerodynamic elements is attached to the first or second serration side along the whole length of the first protruding part. However, in other embodiments, only part of the first protruding part is attached to the first or second serration side, whereas a remaining part of the first protruding part extend above the serration part, creating a gap between part of the first protruding part and the serrated part. In some embodiments, the first protruding part may even extend beyond the serration part.

The number of protruding aerodynamic elements on each serration may be the same or different between different serrations. Furthermore, the specific arrangement of the number of aerodynamic elements on different serrations may be the same or different.

Each of the number of protruding aerodynamic elements is separated by a pre-determined distance. The distance between adjacent protruding aerodynamic elements may be the same between each protruding aerodynamic element or it may be different. Thus, a first predetermined distance between a first and second protruding aerodynamic element and a second predetermined distance between a second and third protruding aerodynamic element may be the same or different.

In some embodiments, the number of protruding aerodynamic elements is a plurality of protruding aerodynamic elements, including a first protruding aerodynamic element and a second protruding aerodynamic element, wherein the first and second protruding aerodynamic elements are separated by a distance, and wherein each of the plurality of protruding aerodynamic elements comprises a first protruding part attached to and protruding from the serrated part of the base element; and a second protruding part extending from the first protruding part towards the attachment part at an inclined angle relative to the base element and being configured to be attached to and extend along a second blade side of the wind turbine blade.

In some embodiments, the second part of the first protruding aerodynamic element is substantially straight in a length direction. In some embodiments, the second protruding part of one or more of the number of protruding aerodynamic elements extends in a substantially straight length direction. In some embodiments, the second protruding parts of the number of protruding aerodynamic elements are substantially similar in shape and/or parallel to each other.

In some embodiments, the number of protruding aerodynamic elements comprises a third aerodynamic part extending from the first aerodynamic part away from the attachment part, projecting out from the serrated part.

The number of protruding aerodynamic elements, including the first protruding aerodynamic element, have a first end, arranged above the attachment part and a second end, proximal to the apex of the serrations. The first and second ends are configured to be arranged nearest and farthest from the leading edge of the wind turbine blade, respectively.

In preferred embodiments, one or more of the number of protruding aerodynamic elements, such as the first protruding aerodynamic element, tapers in height towards the first and second end, such as to form an optimized aerodynamic shape.

In some embodiments, two protruding aerodynamic elements are arranged around the valley region between two adjacent serrations, such that the two protruding aerodynamic elements together form a channel for guiding air towards the valley region between the two adjacent serrations. The beneficial effect of the channel upstream of the serration valley is that it reduces the flow speed at the most critical point of the serrations and by this the noise level generated from this region.

In some embodiments, the two protruding aerodynamic elements are arranged around a protruding aerodynamic element arranged at the valley region between the two adjacent serrations, such as to form two channels for guiding air on each side of the valley region.

In some embodiments, the first protrusion part of the protruding aerodynamic element is attached to the first serration and curves towards the second serration so that at least a part of the first protruding aerodynamic element extends as a winglet over the valley region between the first and second serration. In this way, the protruding aerodynamic element obtains a winglet-like shape.

In some embodiments, the number of protruding aerodynamic elements further includes a second protruding aerodynamic element, and wherein the first protruding aerodynamic element is attached to the first serration and the second protruding aerodynamic element is attached to the second serration, and wherein the first protruding aerodynamic element and the second protruding aerodynamic element are connected through a connecting section. The connecting section may extend from the first protruding parts or second protruding parts of the aerodynamic elements.

In some embodiments, a protruding aerodynamic element on one serration and protruding aerodynamic element on another serration are connected through a connecting section to form a U-shaped element. The connecting section may extend from the first protruding parts or second protruding parts of the aerodynamic elements.

The winglets and channels build up their own boundary layer, which reduces the effective flow speed at the serration valleys. By having channels or winglets positioned close to the serration valley, the flow is straightened, and larger vertical direction change with respect to the blade surface is avoided for varying angles of attacks and boundary layer thicknesses. These channels or winglets may be mostly flat/parallel to the trailing edge to avoid the boundary layer 'lift-off'. However, the winglets could also be bent around more than 90 degrees to fold back towards the airfoil surface.

In some embodiments, the first protruding aerodynamic element is a finlet.

In some embodiments, the first protruding aerodynamic element is a cone shaped element.

In some embodiments, the largest height of the first protruding aerodynamic element is located between the first and second protruding parts and wherein the height is tapering towards a first and/or a second end of the protruding aerodynamic element.

In some embodiments, the largest diameter of the first protruding aerodynamic element is located between the first and second protruding parts and wherein the diameter is tapering towards a first and/or a second end of the protruding aerodynamic element.

In some embodiments, the first blade side of the wind turbine blade is the suction side, and the second blade side of the wind turbine blade is the pressure side.

In a second aspect, the present invention relates to a wind turbine blade having a profiled contour including a pressure side and a suction side, and a leading edge and a trailing edge with a chord having a chord length extending therebetween, the wind turbine blade extending in a spanwise direction between a root end and a tip end, the wind turbine blade comprising a trailing edge panel according to the first aspect of the present invention provided along at least a portion of the trailing edge of the wind turbine blade.

It will be understood that any of the above-described features may be combined in any embodiment of the invention. In particular, embodiments described with regard to the trailing edge panel may also apply to the wind turbine blade and vice versa.

In another aspect, the present disclosure relates to a wind turbine blade comprising
- a plurality of cone shaped serrations attached to the trailing edge of the wind turbine blade,
- a number of protruding aerodynamic elements being attached to and extending from the trailing edge of the wind turbine blade and upstream a second blade side of the wind turbine blade in a direction substantially perpendicular to the trailing edge of the wind turbine blade.

The cone shaped serrations each comprises a base section with a cross-sectional shape extending and tapering into a serration tip.

Preferably, the cross-sectional shape of the base section is circular, elliptical or square. However, the cross-sectional shape of the base section may also have a more complex shape. Preferably, the serration tip of the cone shaped serrations is rounded.

In some embodiments, the trailing edge has a flatback configuration.

In some embodiments, the base section of the cone shaped serrations is configured to be individually attached to the flatback trailing edge surface. In some embodiments, the cone shaped serrations are arranged on a trailing edge panel which is configured to be attached to the flatback trailing edge surface. In still other embodiments, the trailing edge panel comprises an attachment part wherefrom the cone shaped serration extends, wherein the attachment part is configured to be attached to a first side of the wind turbine blade. In some embodiments, both the base section of the cone shaped serrations and the attachment part of the trailing edge panel are configured to be attached to the trailing edge of the wind turbine blade.

The base section of the cone shaped serrations and/or the trailing edge panel may be attached to the flatback surface and/or first surface of the wind turbine blade using adhesives, fasteners or the like.

Thus, in some embodiments, the wind turbine blade comprises
- a trailing edge panel attached to a trailing edge of the wind turbine blade, the trailing edge panel comprising:
  - a base element having
    - an attachment part attached to and extending from the trailing edge of the wind turbine blade and to an upstream position on a first blade side of the wind turbine blade,
    - a serrated part extending from the attachment part and projecting out from the trailing edge of the wind turbine blade, wherein the serrated part comprises a plurality of cone shaped serrations, including a first cone shaped serration and a second cone shaped serration,
  - a number of protruding aerodynamic elements being attached to and extending from the trailing edge of the wind turbine blade and upstream a second blade side of the wind turbine blade in a direction substantially perpendicular to the trailing edge of the wind turbine blade.

In contrast to the other aspects of the present disclosure, the number of aerodynamic elements does not extend from the serrated part in this aspect, but is only attached to and extending from the trailing edge of the wind turbine blade i.e. the number of aerodynamic elements only comprises a second protruding part which does not extend onto the cone-shaped serrations.

Preferably, the number of protruding aerodynamic elements is a plurality of finlets extending in a direction substantially perpendicular to the trailing edge of the wind turbine blade. Each finlet has a height and preferably tapers in height towards a first and a second end of the finlet. The finlets are preferably arranged in a specific pattern, with one finlet extending from the valley section between each cone shaped serration. Furthermore, two finlets are preferably arranged on each side of the finlet extending from the valley section. The two finlets arranged on each side of the finlet extending from the valley section being arranged with a pre-determined distance to the middle finlet. This arrangement will make sure that specific channels where air flows are created and that these channels guide the air on each side of the valley section between two adjacent cone shaped serrations.

BRIEF DESCRIPTION OF THE FIGURES

The invention is explained in detail below with reference to embodiments shown in the drawings, in which.

DETAILED DESCRIPTION

Figure 1:
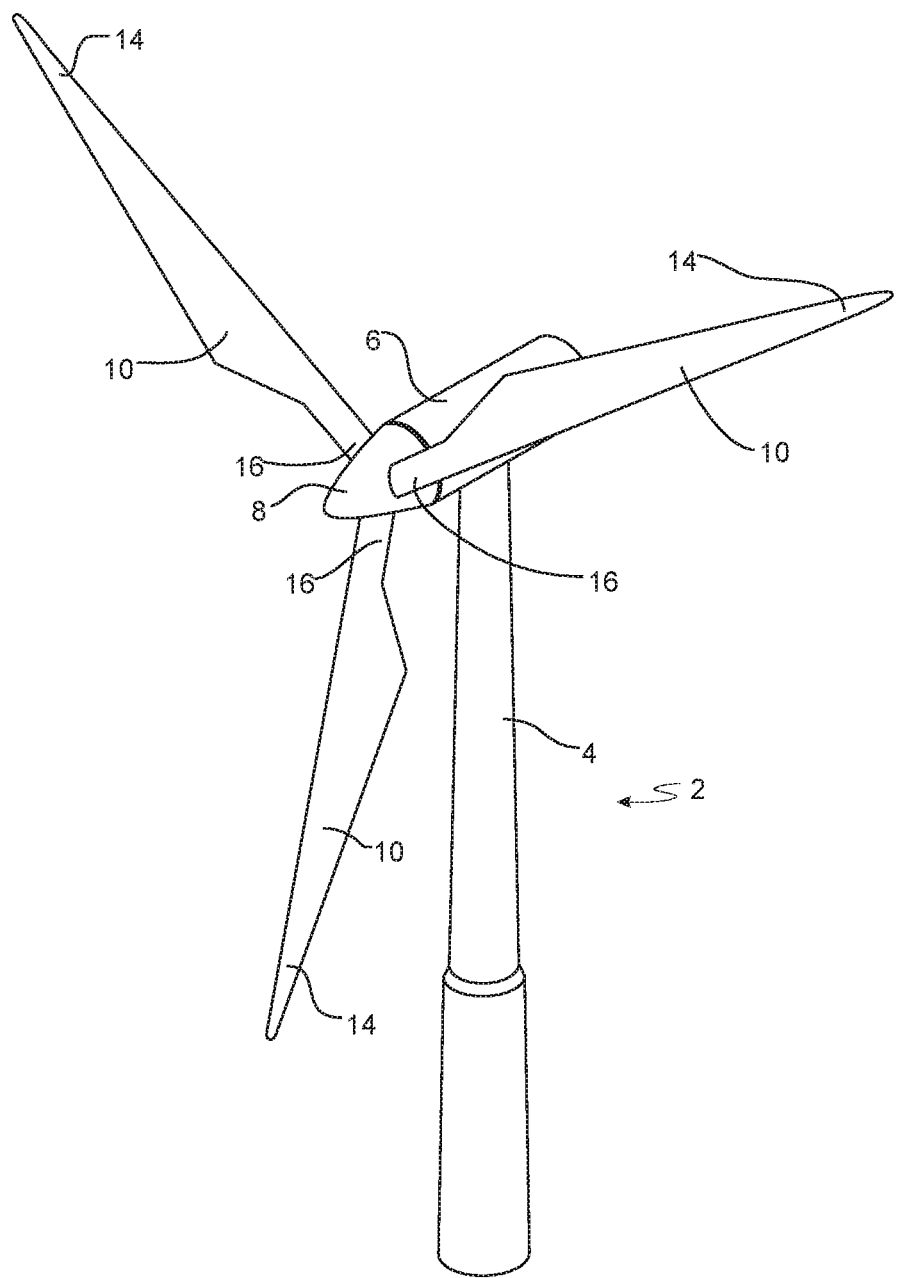
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
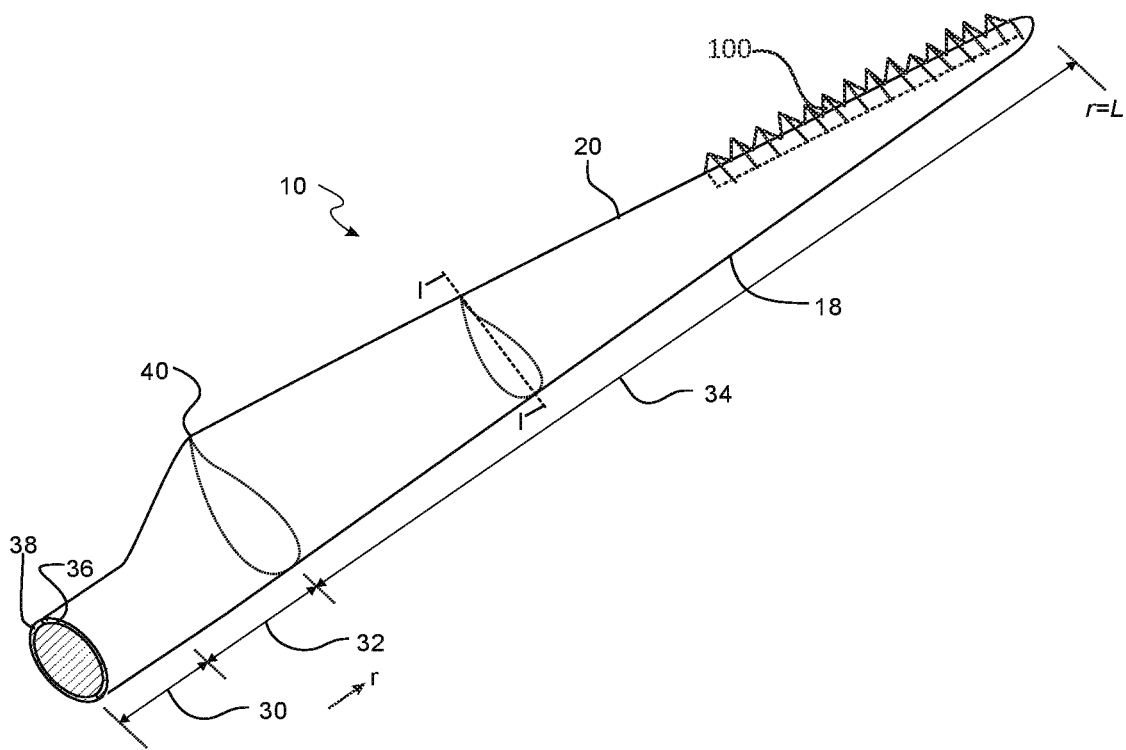
FIG. 2 shows a schematic view of a wind turbine blade.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. Finally, the wind turbine blade 10 comprises a trailing edge panel 100 according to the present invention, attached to the trailing edge of the wind turbine blade 10.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3A is a schematic illustration of a top view of the elements of a trailing edge panel 100 according to an embodiment of the present invention. FIG. 3B is a schematic illustration of a trailing edge panel comprising the elements shown in FIG. 3A and configured to be attached to the trailing edge of a wind turbine blade. FIG. 3C schematically illustrates the trailing edge panel of FIG. 3B attached to the trailing edge panel of a wind turbine. FIGS. 4A-4C are schematic illustrations of cross-sectional views of FIGS. 3A-3C.

FIGS. 3A and 4A show a base element 101 and an aerodynamic protruding element 110. The base element 101 has an attachment part 120 and a serrated part 130. The attachment part 120 is configured to be attached to the surface of a wind turbine blade between the trailing edge 20 of a wind turbine blade 10 and an upstream position on a first blade side 11 of the wind turbine blade 10 (See FIGS. 3B, 3C, 4B and 4C).

Figure 3:
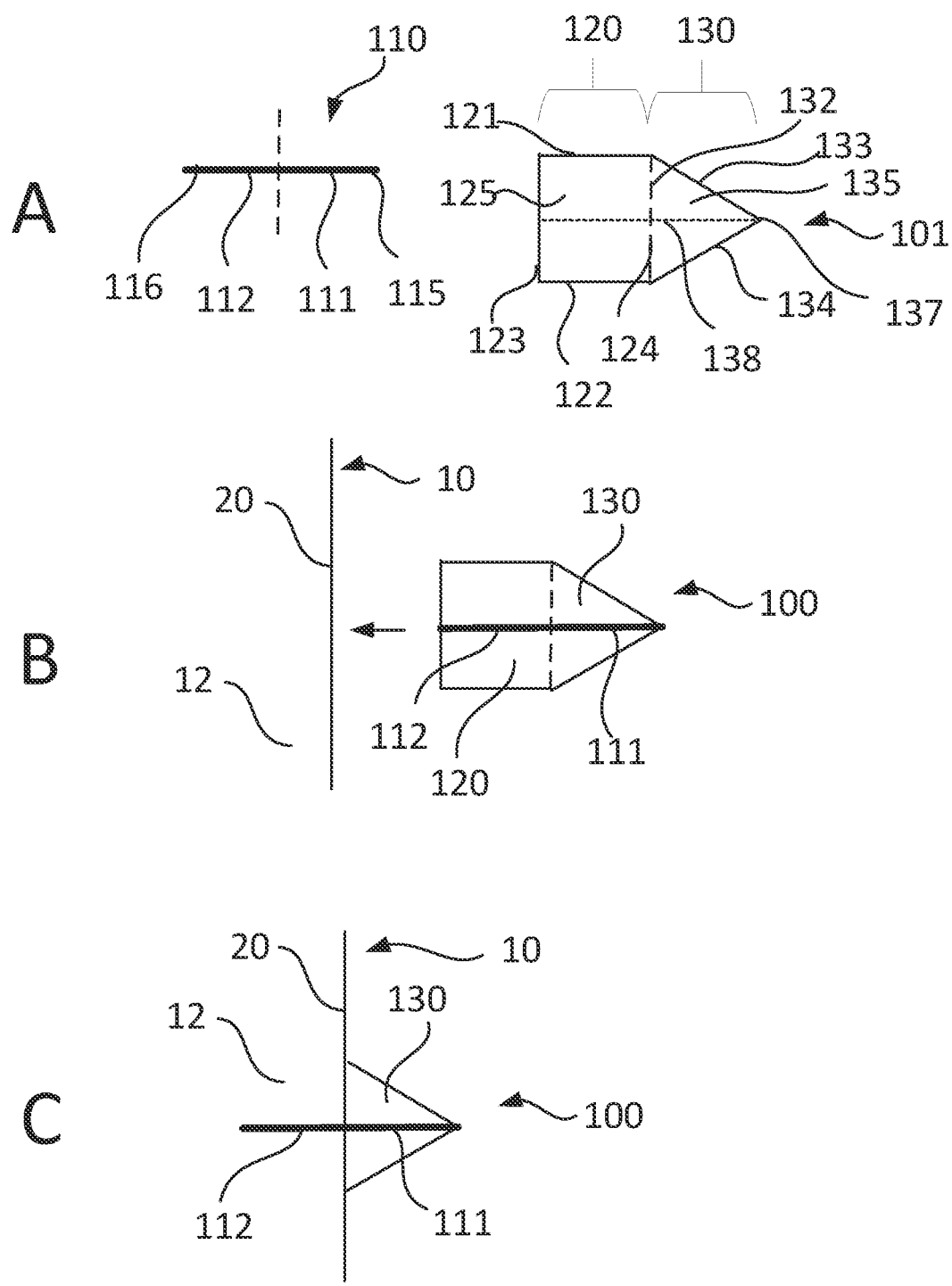
FIG. 3 shows a schematic illustration of a cross-sectional view of a trailing edge panel comprising one serration.
Figure 4:
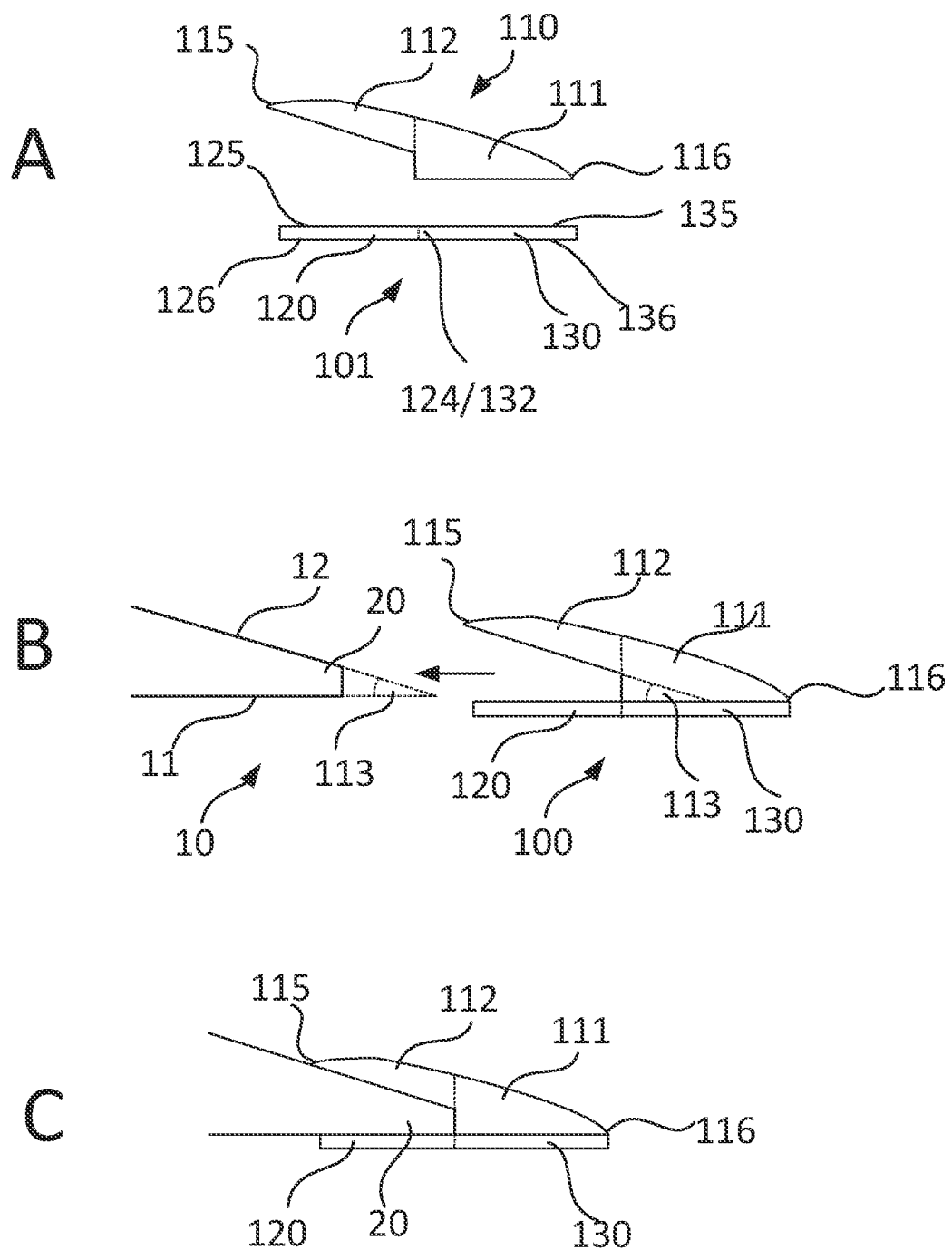
FIG. 4 shows a schematic illustration of a cross-sectional view of the trailing edge panel of FIG. 3.

In the embodiments shown in FIGS. 3 and 4, the attachment part 120 is a substantially square element comprising a first longitudinal end 121 for arrangement nearest a tip end 14 of the wind turbine blade 10, a second longitudinal end 122 for arrangement nearest a root end 16 of the wind turbine blade 10, a first side 123 for arrangement nearest a leading edge 18 of the wind turbine blade 10 and a second side 124 for arrangement farthest from the leading edge 18 of the wind turbine blade 10. As can be seen in FIGS. 3A and 4A, the second side 124 of the attachment part 120 forms a boundary or interface between the attachment part 120 and the serrated part 130. The attachment part 120 further comprises a first attachment surface 125 configured for being attached to the first blade side 11 of the wind turbine blade 10, and a second attachment surface 126 arranged opposite the first attachment surface 125 and configured for facing away from the first blade side 11 of the wind turbine blade (not visible in FIG. 3). The attachment part 120 has a thickness between the first and second attachment surface (not visible in FIG. 3)

The serrated part 130 extends from the attachment part 120 and is configured to project out from the trailing edge 20 of the wind turbine blade 10. In the embodiment shown in FIGS. 3 and 4, the serrated part 130 comprises a single serration. The serration has a base side 132 proximal to the second side 124 of the attachment part 120 and an apex 137 distal to the second side 124 of the attachment part 120 with a notional line 138 extending from a midpoint of the base side 132 to the apex 137. The base side 132 forms an interface or boundary separating the attachment part 120 from the serration. The serration further comprises a first serration side 133 extending between the base side 132 and the apex 137, and a second serration side 134 extending between the base side 132 and the apex 137. Finally, the serration comprises a first serration surface defined by the base side 132, the apex 137, the first side 133 and the second side 134, as well as a second serration surface 136 arranged opposite of the first serration surface 134. The first serration surface 135 may be flush with the first attachment surface, and the second serration surface 136 may be flush with the second attachment surface 126 (not visible in FIG. 3). In the illustrated figure, the serrated part 130 has a thickness between the first and second serration surface 135, 136, being the same as the thickness between the first and second attachment side 125, 126 (not visible in FIG. 3). However, this is not necessary.

FIGS. 3A and 4A further illustrate a protruding aerodynamic element 110, in this case a finlet. The protruding aerodynamic element 110 comprises a first protruding part 111 and a second protruding part 112, as can be seen in FIG. 4A. The two protruding parts 111, 112 are separated by a plane extending perpendicular to the base element i.e. vertically from the base side/the second attachment side 124. The first protruding part 111 is straight in a length direction and configured to be attached to and protrude from the serrated part 130 of the base element 101. The second protruding part 112 extends from the first protruding part 111 towards the attachment part 120 at an inclined angle 113 relative to the base element 101. The second protruding part is also straight in a length direction.

In FIG. 3A, the finlet is illustrated as a black line for simplicity. Since the first and second parts 111, 112 are straight and extend in the same plane, it is not possible to distinguish the different parts in FIG. 3A. The lower surface of the second protruding part 112 is configured to be attached to and extend along the second blade side 12 of the wind turbine blade 10. The protruding aerodynamic element 110 further comprises a first end 115 and a second end 116. The first end 115 is part of the second protruding part 112 configured to be arranged nearest the leading edge of the wind turbine blade 10. The second end 116 is part of the first protruding part 111 configured to be arranged farthest away from the leading edge of the wind turbine blade 10. As can be seen in FIG. 4A, the finlet tapers in height toward the first and second ends to obtain an aerodynamic optimized shape.

FIGS. 3B and 4B schematically illustrate a trailing edge panel 100 according to an embodiment of the present invention comprising the base element 101 and the protruding aerodynamic element 110 of FIGS. 3A and 4A, respectively. As can be seen in FIGS. 3B and 4B, the first protruding part 111 of the protruding aerodynamic element 110 is attached to the serrated part 130 of the base element 101. The first protruding part 111 extends between the apex 137 of the serration to the base side 132 of the serration, in a length direction parallel to the notional line 138. The inclined angle 113, at which the second protruding part 112 extends from the first protruding part 111 towards the attachment part 120 relative to the base element 101 is the inclined angle 113 between the first attachment surface 125 and a lower surface of the second part 112 of the first protruding aerodynamic element 110.

Furthermore, FIGS. 3B and 4B illustrate a trailing edge 20 onto which the trailing edge panel 100 is configured to be attached. A wind turbine blade 10 has a first blade side 11 and a second blade side 12 intersecting at the trailing edge 20. The first and the second blade side 11, 12 extend from the trailing edge 20 in two different length directions, and thus, an inclined angle 113 exists between the first and second blade side 11, 12. As can be seen in FIG. 4B, the inclined angle 113 between the first and second blade side 11, 12 corresponds to the inclined angle 113 between the first attachment surface 125 and a lower surface of the second protruding part 112 of the aerodynamic element 110. In that way, the base element 101 and the first protruding aerodynamic element 110 together form a clamp shape adapted to be fitted onto the trailing edge 20 of the wind turbine blade 10.

FIGS. 3C and 4C illustrate a trailing edge 20 onto which the trailing edge panel 100, shown in FIGS. 3B and 4B, has been attached. The attachment part 120 of the base element 101 is attached to a part of the first blade side 11 of the wind turbine blade 10 (not visible in FIG. 3C). The serrated part 130 of the base element 101 projects from the trailing edge 20 and the protruding aerodynamic element 110 is attached to the serrated part 130 and extends along the second blade side 12, onto which it is attached.

Figure 5:
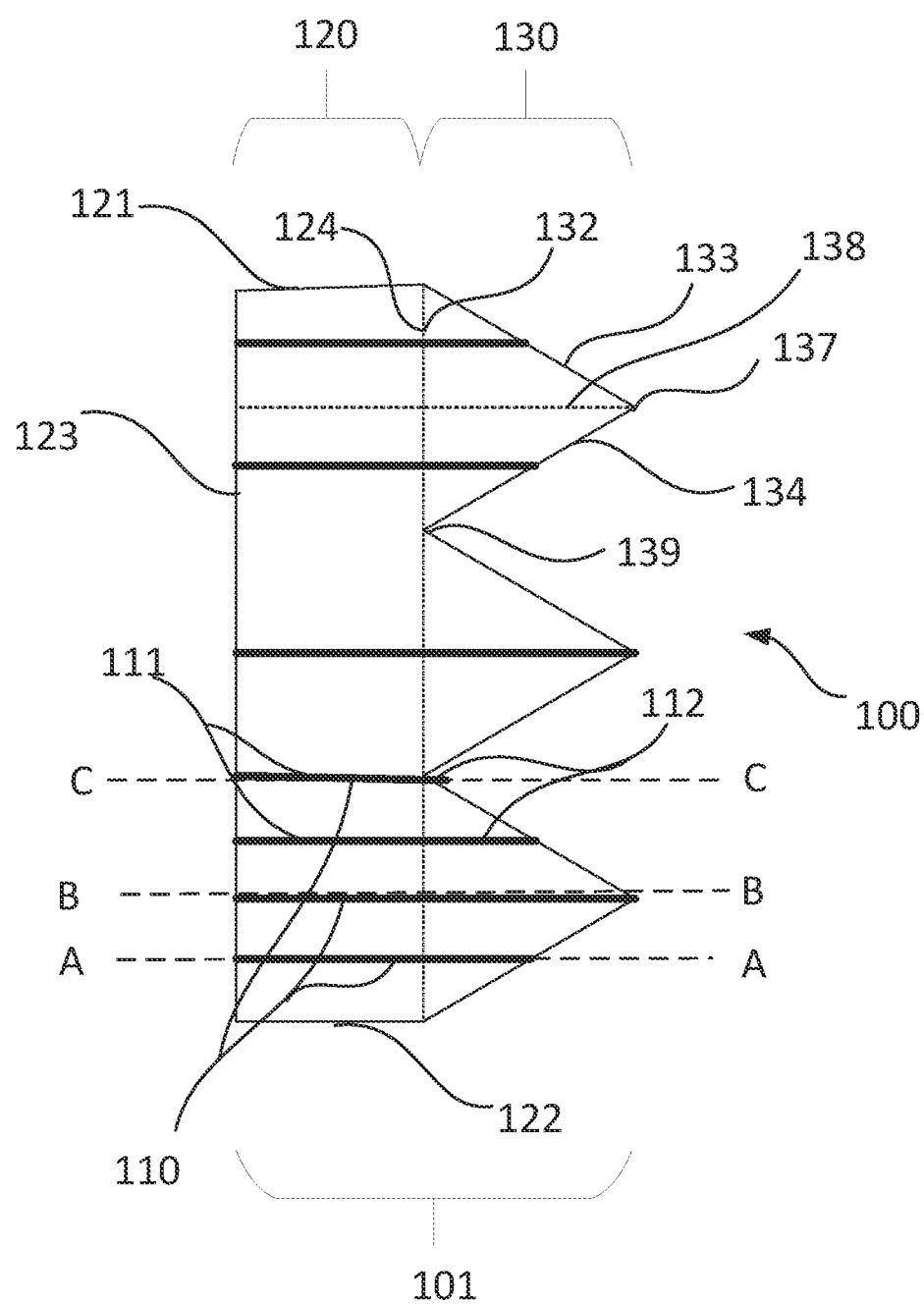
FIG. 5 shows a schematic illustration of a top view of a trailing edge panel comprising three serrations with a varying number and arrangement of protruding aerodynamic elements.
Figure 7:
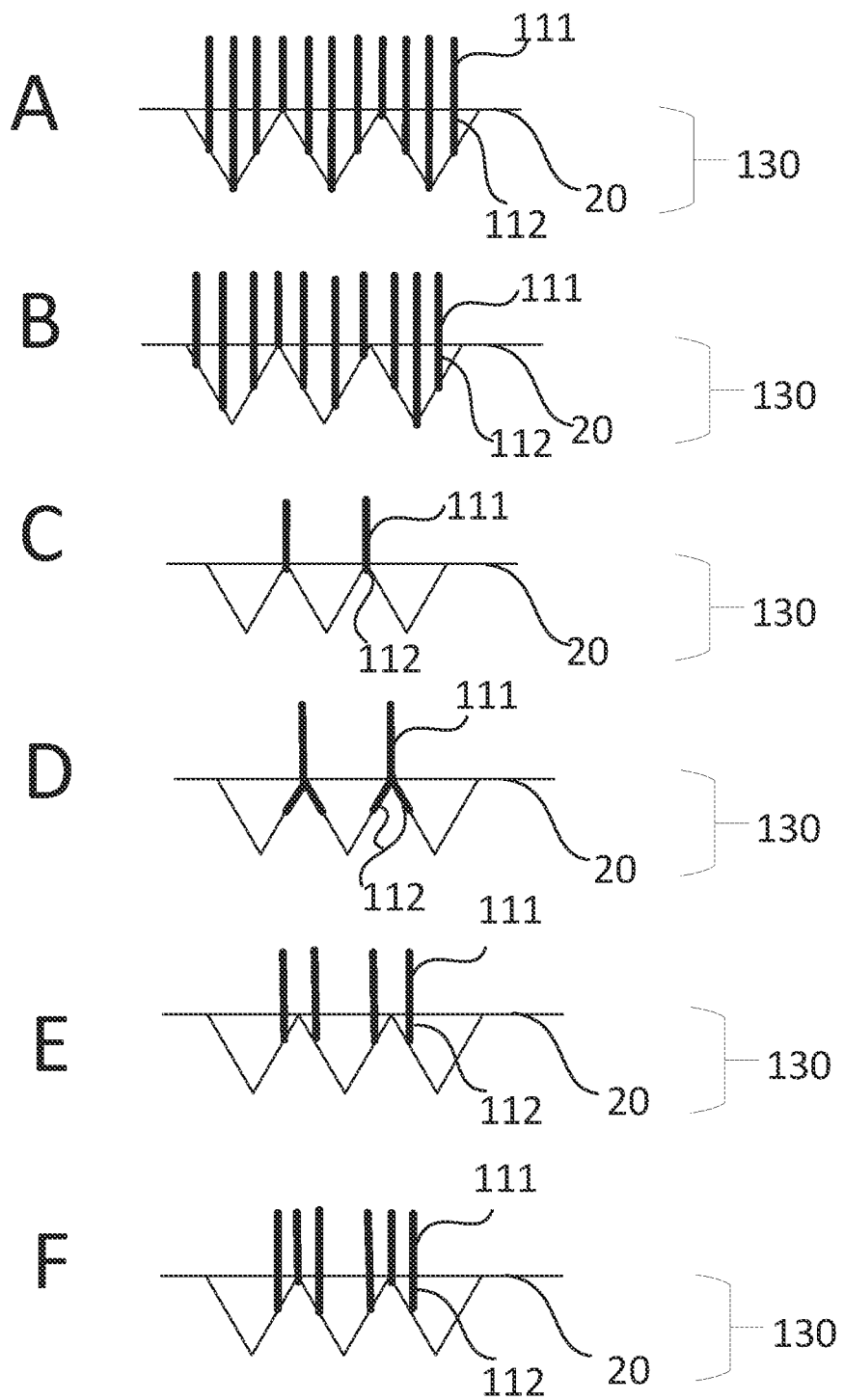
FIG. 7 shows a schematic illustration of a top view of a plurality of trailing edge panels attached to the trailing edge of a wind turbine blade comprising a plurality of protruding aerodynamic elements arranged in different patterns.
Figure 8:
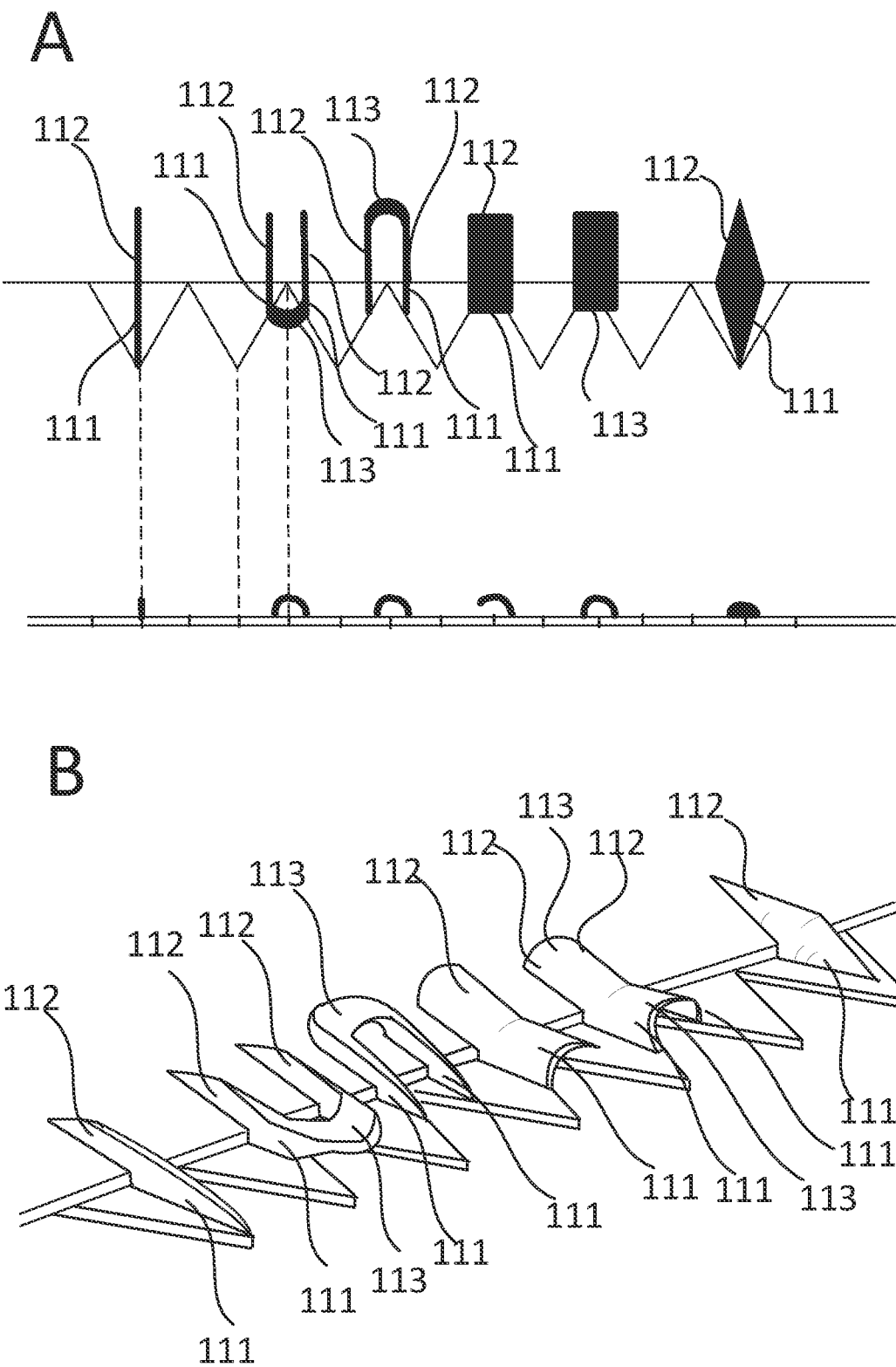
FIG. 8 shows a schematic illustration of a top view of a plurality of different embodiments of protruding aerodynamic elements according to the present invention.

FIGS. 3 and 4 illustrate a base element with the serrated part 130 comprising only one serration. However, in preferred embodiments, the serrated part 130 comprises a plurality of serrations arranged adjacent to each other along the second side of the attachment part 120. FIGS. 5 and 7 schematically illustrate a trailing edge panel 100 comprising three serrations, whereas FIG. 8 schematically illustrates a trailing edge panel comprising seven serrations. However, in preferred embodiments, the serrated part 130 comprises more than ten serrations.

FIG. 5 illustrates a top view of a trailing edge panel according to an embodiment of the present invention.

The trailing edge panel 100 shown in FIG. 5 comprises a base element 101 and a plurality of aerodynamic protruding elements 110. The base element 101 has an attachment part 120 and a serrated part 130.

The attachment part 120 is configured to be attached to and extend from the trailing edge 20 of a wind turbine blade 10 and to an upstream position on a first blade side 11 of the wind turbine blade 10. In the embodiments shown in FIG. 5, the attachment part 120 is a substantially rectangular element comprising a first longitudinal end 121 for arrangement nearest a tip end 14 of the wind turbine blade 10, a second longitudinal end 122 for arrangement nearest a root end 16 of the wind turbine blade 10, a first side 123 for arrangement nearest a leading edge 18 of the wind turbine blade 10 and a second side 124 for arrangement farthest from the leading edge 18 of the wind turbine blade 10. The second side 124 of the attachment part 120 forms an interface or boundary separating the attachment part 120 from the serrated part 130. The attachment part 120 further comprises a first attachment surface 125 configured for being attached to the first blade side 11 of the wind turbine blade 10, and a second attachment surface 126 arranged opposite the first attachment surface 125 and configured for facing away from the first blade side 11 of the wind turbine blade (not visible in FIG. 5). The attachment part 120 has a thickness between the first and second attachment surface (not visible in FIG. 5)

The serrated part 130 extends from the attachment part 120 and is configured to project out from the trailing edge 20 of the wind turbine blade 10. In the embodiment shown in FIG. 5, the serrated part 130 comprises three serrations, a first, second and third serration, arranged adjacent to each other such as to form a valley region 139 between adjacent serrations. Each serration has a base side 132 proximal to the second side 124 of the attachment part 120 and an apex 137 distal to the second side 124 of the attachment part 120 with a notional line 138 extending from a midpoint of the base side 132 to the apex 137. The base side 132 of each serration forms a boundary or interface separating the attachment part 120 from the serration. Each serration further comprises a first serration side 133 extending between the base side 132 and the apex 137, and a second serration side 134 extending between the base side 132 and the apex 137. Finally, each serration comprises a first serration surface 135 in continuance of the first attachment surface 125, defined by the base side 132, the apex 137, the first side 133 and the second side 134, as well as a second serration surface 136 arranged opposite the first serration surface 135 continuing from the second attachment surface 126 (not visible in FIG. 5). The serrated part 130 also has a thickness between the first and second serration surface 135, 136 and is the same as the thickness between the first and second attachment side 125, 126 (not visible in FIG. 5).

The valley region 139 between two adjacent serrations is considered the region where a first serration side 133 of one serration and a second serration side 134 of an adjacent serration meet. Thus, the first serration and the second serration are arranged adjacent to each other, such that a valley region 139 is formed between the first serration side 133 of the first serration and the second serration side 134 of the second serration. Furthermore, the second serration and the third serration are arranged adjacent to each other, such that a valley region 139 is formed between the first serration side 133 of the second serration and the second serration side 134 of the third serration.

FIG. 5 further illustrates seven protruding aerodynamic elements 110, in this case finlets. Three protruding aerodynamic elements 110 are arranged on the first serration, one protruding aerodynamic element 110 is arranged on the second serration, two protruding aerodynamic elements 110 are arranged on the third serration and one protruding aerodynamic element 110 is arranged at the valley region 139 between the first and second serration.

Figure 6:
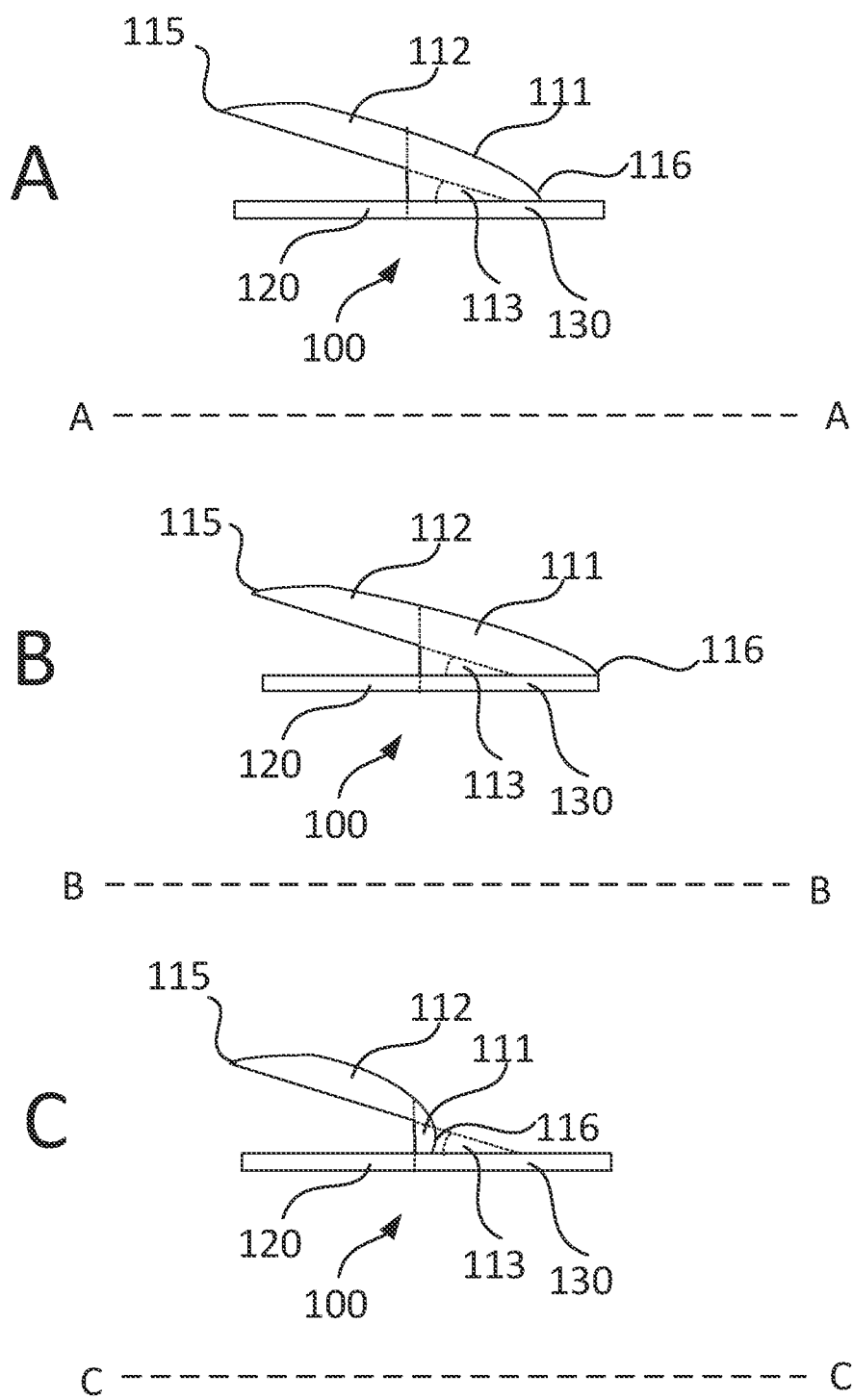
FIG. 6 shows a schematic illustration of a cross-sectional view of three different protruding aerodynamic elements of FIG. 5.

In FIG. 5, the finlets are illustrated as a black line for simplicity. Since the first and second parts 111, 112 are straight and extend in the same plane, it is not possible to distinguish the different parts in FIG. 5. However, FIG. 6 illustrates three cross-sectional views A-A, B-B and C-C, where the shape of the finlets can be seen.

A first protruding part 111 of one protruding aerodynamic element 110 arranged on the first serration and the protruding aerodynamic element 110 arranged on the second serration, extends from the apex 137 to the base side 132 of that serration, in a length direction parallel to the notional line 138. A cross-sectional view B-B is illustrated in FIG. 6B, where it can be seen that the second protruding part 112 extends from the first protruding part 111 toward the attachment side at an inclined angle 113 relative to the base element 101. The second protruding part 112 is also straight in a length direction.

The first protruding part 111 of two protruding aerodynamic elements 110 on the first serration and two protruding aerodynamic elements 110 on the third serration extend either from a first serration side 133 or a second serration side 134 of the serration to the base side 132 of that particular serration. A cross-sectional view A-A is illustrated in FIG. 6A, where it can be seen that the second protruding part 112 extends from the first protruding part 111 towards the attachment part 120 at an inclined angle 113 relative to the base element 101. The second protruding part 112 is also straight in a length direction.

The first protruding part 111 of the aerodynamic protruding element 110 is attached at the valley region 139 between the first and second serration surface. This can be seen in FIG. 6C, illustrating a cross-sectional view C-C. Furthermore, it can be seen that the second protruding part 112 extends from the first protruding part 111 towards the attachment part 120 at an inclined angle 113 relative to the base element 101. The second protruding part 112 is also straight in a length direction.

The lower surface of the second protruding part 112 of each protruding aerodynamic element 110 is configured to be attached to and extend along the second blade side 12 of the wind turbine blade 10. Each protruding aerodynamic element 110 further comprises a first end 115 and a second end 116. The first end 115 is part of the second protruding part 112 configured to be arranged nearest the leading edge 18 of the wind turbine blade 10. The second end 116 is part of the first protruding part 111 configured to be arranged farthest away from the leading edge 18 of the wind turbine blade 10. As can be seen in FIG. 6, the finlets taper in height towards the first and second ends 115, 116 to obtain an aerodynamic optimized shape.

FIGS. 7A-7F illustrate six different embodiments of a trailing edge panel 100 attached to a trailing edge 20 of a wind turbine blade 10 according to the present invention, where the number, arrangement and distance between protruding aerodynamic elements 110 differ between the different embodiments.

The trailing edge panel 100 in each embodiment comprises a serrated part 130 with three serrations, including a first, second and third serration.

In FIG. 7A, each serration comprises three protruding aerodynamic elements 110. Furthermore, a protruding aerodynamic element 110 is attached to the serrated part 130 at the valley region 139 between the first and second serration, as well as between the second and third serration. The protruding aerodynamic elements 110 are arranged in the same way on each serration and the distance between all the protruding aerodynamic elements 110 are substantially the same.

FIG. 7B shows an embodiment where the first, second and third serration comprise three protruding aerodynamic elements 110. Furthermore, a protruding aerodynamic element 110 is attached to the serrated part 130 at the valley region 139 between the first and second serration. The protruding aerodynamic elements 110 are arranged randomly on each serration, such that the arrangement on the first, second and third serration are different. Furthermore, the distance between the protruding aerodynamic elements 110 differs between some protruding aerodynamic elements 110 but is the same between other protruding aerodynamic elements 110.

FIG. 7C illustrates a preferred embodiment according to the present invention, where a protruding aerodynamic element 110 is attached to the serrated part 130 at the valley region 139 between adjacent serrations, i.e. between the first and second serration, as well as between the second and third serration.

FIG. 7D shows an embodiment where a protruding aerodynamic element 110 is attached to the serrated part 130 at the valley region 139 between adjacent serrations, i.e. between the first and second serration, as well as between the second and third serration. The second protruding part 112 of the protruding element aerodynamic element comprises a single element and the first protruding part 111 of the protruding element comprises two diverging sections extending from the second protruding part at the valley region 139 and along part of the first and second serration side. In that way, the protruding aerodynamic elements 110 arranged at valley regions 139 offer more structural integrity to the trailing edge panel 100 compared to the embodiment illustrated in FIG. 7C. The protruding aerodynamic elements 110 are arranged in the same way on each serration and the distance between all the protruding aerodynamic elements 110 is the same.

In some embodiments, a structure similar to that in FIG. 7D can also be obtained by having two aerodynamic elements, each comprising a second protruding part 112 similar to the second protruding part 112 in FIG. 7D, where the two second protruding parts are parallel and separated by a small distance, such as at least ~1 mm gap. Instead of having a diverging first protruding part, each protruding aerodynamic element would instead have a first protruding part 111 extending in only on direction along the edge of a serration, such as to separate the Y-structure in two branches with a gap between them. The gap could also be made larger by offsetting the protruding aerodynamic elements slightly onto the serrations, creating a small channel between the two protruding aerodynamic elements.

FIG. 7E shows an embodiment, where two aerodynamic elements are arranged around the valley region 139 between two adjacent serrations, i.e. between the first and second serration as well as between the second and third serration. In that way, the two protruding aerodynamic elements 110 together form a channel for guiding air towards the valley region 139 between two adjacent serrations. The protruding aerodynamic elements 110 are arranged in the same way on each serration and the distance between some of the protruding aerodynamic elements 110 are the same, while it is different for other protruding aerodynamic elements 110.

FIG. 7F shows an embodiment where two aerodynamic elements are arranged around the valley region 139 between two adjacent serrations, as described for FIG. 7E. Furthermore, a protruding aerodynamic element 110 is attached to the serrated part 130 at the valley region 139 between adjacent serrations, i.e. between the first and second serration, as well as between the second and third serration. In this way, two channels for guiding air on each side of the valley region 139 is formed. The protruding aerodynamic elements 110 are arranged in the same way on each serration and the distance between some of the protruding aerodynamic elements 110 is the same, while it is different for other protruding aerodynamic elements 110.

FIG. 8 is a schematic illustration of different embodiments of protruding aerodynamic elements 110 according to the present invention.

FIG. 8A illustrates a top view and a cross-sectional view of six different configurations of protruding aerodynamic elements 110, whereas FIG. 8B illustrates a three-dimensional view of the protruding aerodynamic elements 110 of FIG. 8A.

The first protruding aerodynamic element 110 (from the left) illustrated in FIGS. 8A and 8B is a finlet as shown in FIG. 2-7.

The second and third protruding aerodynamic elements 110 (from the left) illustrated in FIG. 8A in 8B each comprise two protruding aerodynamic elements 110 attached to adjacent serrations and connected through a rounded connecting section 114. In this way, a channel is formed in the same way as explained for FIG. 7E. However, due to the connecting section 114, the protruding aerodynamic elements 110 offer more structural reinforcement to the trailing edge panel. For the second protruding aerodynamic element 110 (from the left in the figure), the connecting section 114 is located between the second protruding part of the two protruding aerodynamic elements 110, whereas for the third protruding aerodynamic element 110 (from the left), the connecting section 114 is located between the first protruding part 111 of the two protruding aerodynamic elements 110.

The fourth protruding aerodynamic element 110 (from the left) illustrated in FIGS. 8A and 8B is attached to only one serration and curves towards another serration, so that part of the first protruding aerodynamic element 110 extends as a winglet over the valley region 139 between the two adjacent serrations.

The fifth protruding aerodynamic element 110 (from the left) illustrated in FIGS. 8A and 8B comprises two protruding aerodynamic elements 110 attached to two adjacent serrations and is connected through a rounded connecting section 114 along the whole length direction. In this way, a channel is formed for guiding air. Furthermore, the protruding aerodynamic elements 110 offer more structural reinforcement to the trailing edge panel than other embodiments.

The sixth protruding aerodynamic element 110 (from the left) illustrated in FIGS. 8A and 8B is not a finlet but a three-dimensional cone-shaped structure, which tapers towards the first and second edge, such as to form an optimized aerodynamic shape. Such a protruding aerodynamic element 110 also offers more structural reinforcement to the trailing edge panel than other embodiments.

In preferred embodiments, the connection section 114, channel or winglet of each protruding aerodynamic should at least be arranged just upstream or over the valley region. It is not necessary that the connection part 114, channel or winglet extend along the whole length of the protruding aerodynamic element, as the case for some of the aerodynamic elements illustrated in FIG. 8.

FIG. 9A is a schematic illustration of a cross-sectional view of an embodiment according to the present invention, wherein a trailing edge panel comprising cone shaped serrations is attached to a trailing edge of a wind turbine blade with a flatback trailing edge surface 21 i.e. a flat surface extending between the first and second side of the wind turbine blade. FIG. 9B shows a three-dimensional view of FIG. 9A.

The trailing edge panel in FIGS. 9A and 9B comprises a base element 101 and two aerodynamic protruding elements.

The base element 101 has an attachment part 120 and a serrated part 130. The attachment part 120 is configured to be attached to the surface of a wind turbine blade between the trailing edge 20 of a wind turbine blade 10 and an upstream position on a first blade side 11 of the wind turbine blade 10.

Figure 9:
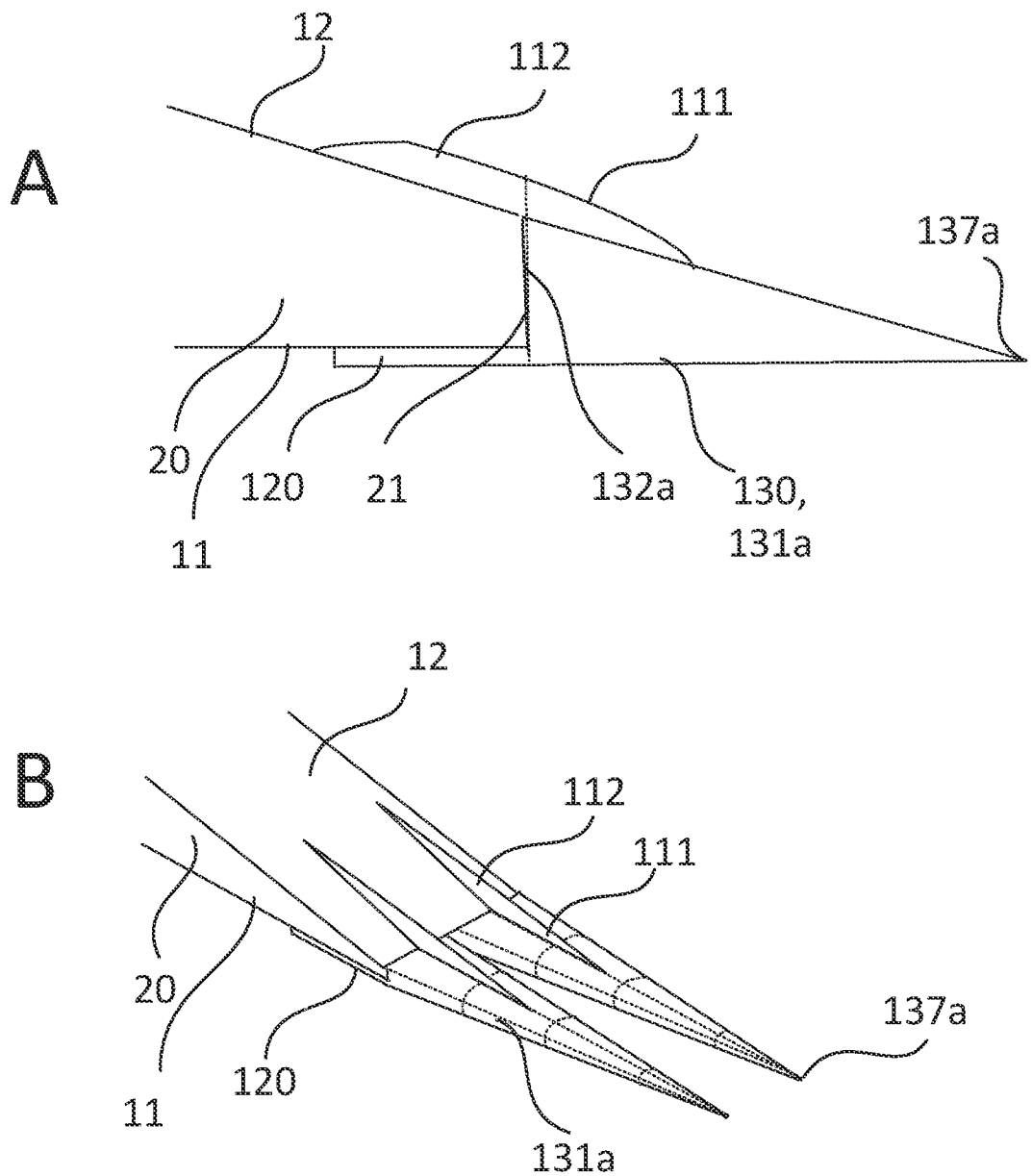
FIG. 9 shows a schematic illustration of a cross-sectional view and a three-dimensional view of an embodiment according to the present invention, wherein the trailing edge panel comprises cone-shaped serrations.

In the embodiments shown in FIG. 9, the attachment part 120 is a substantially square and flat element. The serrated part 130 extends from the attachment part 120 and is configured to project out from the trailing edge 20 of the wind turbine blade 10. In the embodiment shown in FIG. 9B, the serrated part 130 comprises two cone shaped serrations 131a. The cone shaped serrations each comprises a base section 132a with a cross-sectional shape extending and tapering into a serration tip 137. Part of the base section of each cone shape serration 131a extends from the attachment part 120, whereas part of the base section is attached to the flatback trailing edge 132a.

The trailing edge panel further comprises two protruding aerodynamic elements each comprising a first protruding part 111 and a second protruding part 112. The two protruding parts 111, 112 are separated by a plane extending perpendicular to the base element i.e. vertically from the base side/the second attachment side 124. The first protruding part 111 is straight in a length direction and configured to be attached to and protrude from the serrated part 130 of the base element 101. The second protruding part 112 extends from the first protruding part 111 towards the attachment part 120 at an inclined angle 113 relative to the base element 101. The second protruding part is also straight in a length direction. The lower surface of the second protruding part 112 is configured to be attached to and extend along the second blade side 12 of the wind turbine blade 10.

In FIG. 9, the protruding aerodynamic elements are arranged in the mid-section of each cone shaped serration and only extends along part of the length of the cone shaped serrations 131a. However, in other embodiments, the arrangement and/or pattern of the cone-shaped serrations may be similar to those shown in the preceding figures.

FIG. 10A is a schematic illustration of a cross-sectional view of an embodiment according to another aspect of the present disclosure, wherein a wind turbine blade comprises cone shaped serrations and protruding aerodynamic elements which are not attached to the cone shaped serrations. FIG. 10B is a schematic illustration of a three-dimensional view of FIG. 10A.

Figure 10:
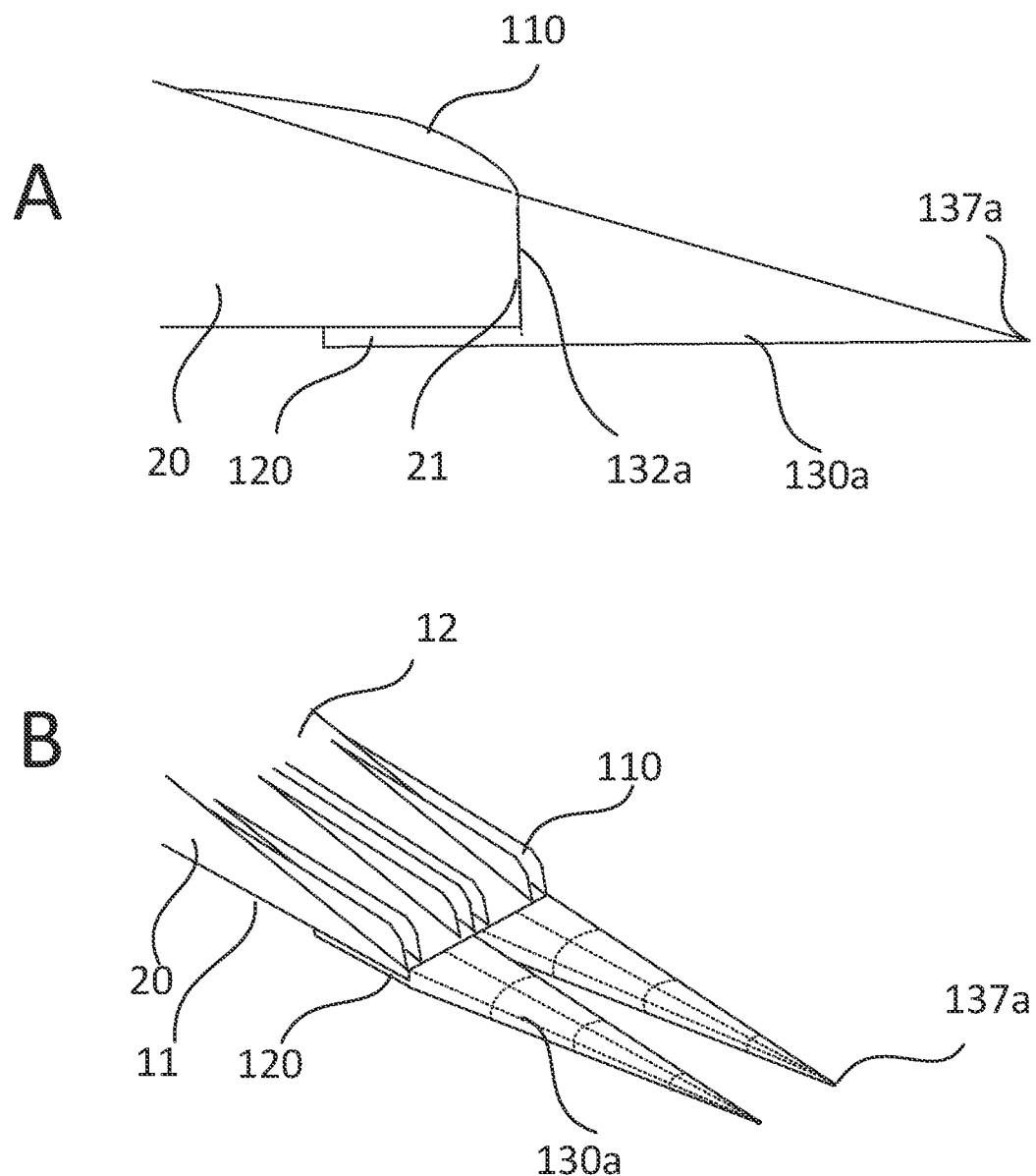
FIG. 10 shows a schematic illustration of a cross-sectional view and a three-dimensional view of an embodiment according to another aspect of the present 25 disclosure, wherein a wind turbine blade comprises cone shaped serrations and protruding aerodynamic elements which does not extend onto the serrated part.

Particularly, FIG. 10 shows the trailing edge 20 of a wind turbine blade comprising a flatback configuration 21 i.e. a flat surface extending between the first and second side of the wind turbine blade. A trailing edge panel comprising an attachment part 120 and cone shaped serrations 130a is attached to the trailing edge of the wind turbine blade. The cone shaped serrations each comprises a base section 132a with a cross-sectional shape extending and tapering into a serration tip 137. Part of the base section 132a of each cone shape serration 131a extends from the attachment part 120, whereas part of the base section 132a is attached to the flatback trailing edge 21 of the wind turbine blade.

The wind turbine blade further comprises a number of aerodynamic elements 112 being attached to and extending from the trailing edge 20 of the wind turbine blade and upstream a second blade side 12 of the wind turbine blade in a direction substantially perpendicular to the trailing edge of the wind turbine blade.

In contrast to the other aspects of the present disclosure, the number of aerodynamic elements does not extend onto the serrations 131 in this aspect but is only attached to and extending from the trailing edge of the wind turbine blade.

In FIG. 10, the number of protruding aerodynamic elements 110 is a plurality of finlets extending in a direction substantially perpendicular to the trailing edge of the wind turbine blade. Each finlet has a height and tapers in height towards a first and a second end of the finlet. The finlets are arranged in a specific pattern, with one finlet extending from the valley section between each cone shaped serration. Furthermore, two finlets are arranged on each side of the finlet extending from the valley section. The two finlets arranged on each side of the finlet extending from the valley section being arranged with a pre-determined distance to the middle finlet. This arrangement will make sure that specific channels where air flows are created and that these channels guide the air on each side of the valley section between two adjacent cone shaped serrations.

LIST OF REFERENCE NUMERALS 2 wind turbine
4 tower
6 nacelle
8 hub
blade
11 first blade side
12 second blade side
14 tip end
16 root end
18 leading edge
trailing edge
21 flatback trailing edge surface
22 pitch axis
root region
32 transition region
34 airfoil region 40 shoulder/position of maximum chord
100 trailing edge panel
101 base element
110 protruding aerodynamic element
110a first protruding aerodynamic element
110b second protruding aerodynamic element
111 first protruding part
112 second protruding part
113 inclined angle
114 connecting section
115 first end
116 second end
120 attachment part
121 first longitudinal end
122 second longitudinal end
123 first side
124 second side
125 first attachment surface
126 second attachment surface
130 serrated part
131 serration
131a cone shaped serration
132 base side
132a base section
133 first serration side
134 second serration side
135 first serration surface
136 second serration surface
137 apex
137a serration tip
138 notional line
139 valley region

The invention claimed is:

1. A trailing edge panel (100) configured to be attached to a trailing edge of a wind turbine blade (10), the trailing edge panel comprising:
a base element (101) comprising:
an attachment part (120) configured to be attached to and extend from the trailing edge (20) of the wind turbine blade and to an upstream position on a first blade side (11) of the wind turbine blade; and
a serrated part (130) extending from the attachment part (120) and being configured to project out from the trailing edge (20) of the wind turbine blade, wherein the serrated part (130) comprises a plurality of serrations, including a first serration and a second serration; and
a number of protruding aerodynamic elements (110), including a first protruding aerodynamic element, comprising:
a first protruding part (111) attached to the serrated part (130) of the base element (101); and
a second protruding part (112) extending from the first protruding part (111) towards the attachment part (120) at an inclined angle (113) relative to the base element (101) and being configured to be attached to and extend along a second blade side (12) of the wind turbine blade.

2. The trailing edge panel according to claim 1, wherein the number of protruding aerodynamic elements (110) is a plurality of protruding aerodynamic elements (110), including a first protruding aerodynamic element and a second protruding aerodynamic element, wherein the first and second protruding aerodynamic elements are separated by a distance, and wherein each of the plurality of protruding aerodynamic elements comprises:
a first protruding part (111) attached to and protruding from the serrated part (130) of the base element (101); and
a second protruding part (112) extending from the first protruding part (111) towards the attachment part (120) at an inclined angle (113) relative to the base element (101) and being configured to be attached to and extend along a second blade side (12) of the wind turbine blade.

3. The trailing edge panel according to claim 1, wherein the attachment part (120) comprises:
a first longitudinal end (121) for arrangement nearest a tip end of the wind turbine blade;
a second longitudinal end (122) for arrangement nearest a root end of the wind turbine blade;
a first side (123) for arrangement nearest a leading edge of the wind turbine blade;
a second side (124) for arrangement farthest from the leading edge of the wind turbine blade;
a first attachment surface (125) configured for being attached to the first blade side (11) of the wind turbine blade; and
a second attachment surface (126) arranged opposite the first attachment surface and configured for facing away from the first blade side of the wind turbine blade;
wherein the first and second serration each comprise:
a base side (132) proximal to the second side (124) of the attachment part (120);
an apex (137) distal to the second side of the attachment part (120) with a notional line (138) extending from a midpoint of the base side (132) to the apex (137);
a first serration side (133) extending between the base side (132) and the apex (137);
a second serration side (134) extending between the base side (132) and the apex (137);
a first serration surface (135) in continuance of the first attachment surface (125), defined by the base side (132), the apex (137), the first serration side (133) and the second serration side (134); and
a second serration surface (136) arranged opposite the first serration surface (135), in continuance with the second attachment surface (125).

4. The trailing edge panel according to claim 1, wherein the first serration and the second serration are arranged adjacent to each other, such that a valley region (139) is formed between the first serration side (133) of the first serration and the second serration side (134) of the second serration or vice versa.

5. The trailing edge panel according to claim 1, wherein the inclined angle (113) is an angle between the first attachment surface (125) and a lower surface of the first protruding aerodynamic element (110) and wherein the inclined angle (113) corresponds to an angle between the first blade side (11) and the second blade side (12) of the wind turbine blade, such that the base element (101) and the first protruding aerodynamic element (110) together forms a clamp shape adapted to be fitted onto the trailing edge (20) of the wind turbine blade.

6. The trailing edge panel according to claim 1, wherein the first protruding part (111) of the first aerodynamic protruding element (110) is attached to the serrated part (130) of the base element (101) at a valley region (139) between the first serration and the second serration.

7. The trailing edge panel according to claim 1, wherein the first protruding part (111) of the first protruding aerodynamic element (110) extends from the apex (137) or from the first or second serration side (133, 134) of the first serration to the base side (132) of the first serration in a direction substantially parallel to the notional line (138).

8. The trailing edge panel according to claim 1, wherein the second part of the first protruding aerodynamic element (110) is substantially straight in a length direction.

9. The trailing edge panel according to claim 1, wherein the first protruding part (111) of the first protruding element (110) comprises two diverging sections extending from the valley region (139) and along part of the first and second serration side.

10. The trailing edge panel according to claim 1, wherein the first protrusion part (111) of the protruding aerodynamic element (110) is attached to the first serration and curves towards the second serration so that at least a part of the first protruding aerodynamic element (110) extends as a winglet over the valley region (139) between the first and second serration.

11. The trailing edge panel according to claim 1, wherein the number of protruding aerodynamic elements (110) further includes a second protruding aerodynamic element (110), and wherein the first protruding aerodynamic element (110) is attached to the first serration, and the second protruding aerodynamic element (110) is attached to the second serration and wherein the first protruding aerodynamic element (110) and the second protruding aerodynamic element (110) are connected through a connecting section (114).

12. The trailing edge panel according to claim 1, wherein the first protruding aerodynamic element (110) is a finlet.

13. The trailing edge panel according to claim 1, wherein the first protruding aerodynamic element (110) is a cone shaped element.

14. The trailing edge panel according to claim 1, wherein the first protruding aerodynamic element (110) has a first end and a second end (115, 116) and wherein the first protruding aerodynamic element (110) is tapering towards the first and/or second end (115, 116), such as to obtain an aerodynamic shape.

15. The trailing edge panel (100) according to claim 1, wherein the first blade side (11) of the wind turbine blade is the suction side and the second blade side (12) of the wind turbine blade is the pressure side.

16. The trailing edge panel (100) according to claim 1, wherein one or more of the plurality of serrations are cone shaped serrations (131*a*), each comprising a base section (132*a*) with a cross-sectional shape, such as circular, elliptical or square, extending and tapering into a serration tip (137*a*).

17. A wind turbine blade (10) having a profiled contour including a pressure side (12) and a suction side (11), and a leading edge (18) and a trailing edge (20) with a chord having a chord length extending therebetween, the wind turbine blade (10) extending in a spanwise direction between a root end (16) and a tip end (14), the wind turbine blade comprising a trailing edge panel (100) according to claim 1, provided along at least a portion of the trailing edge (20) of the wind turbine blade.

* * * * *